(12) United States Patent
Yeh et al.

(10) Patent No.: US 11,419,124 B2
(45) Date of Patent: Aug. 16, 2022

(54) DEVICE AND METHOD FOR CQI FEEDBACK TO ENABLE JOINT DL-UL SCHEDULING IN FULL DUPLEX SYSTEMS

(71) Applicant: Apple Inc., Cupertino, CA (US)

(72) Inventors: Shu-Ping Yeh, Campbell, CA (US); Jingwen Bai, San Jose, CA (US); Sung-En Chiu, La Jolla, CA (US); Ping Wang, San Jose, CA (US); Feng Xue, Redwood City, CA (US); Yang-Seok Choi, Portland, OR (US); Shilpa Talwar, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 138 days.

(21) Appl. No.: 16/086,490

(22) PCT Filed: Apr. 25, 2016

(86) PCT No.: PCT/US2016/029120
§ 371 (c)(1),
(2) Date: Sep. 19, 2018

(87) PCT Pub. No.: WO2017/188918
PCT Pub. Date: Nov. 2, 2017

(65) Prior Publication Data
US 2019/0349945 A1 Nov. 14, 2019

(51) Int. Cl.
*H04W 72/08* (2009.01)
*H04L 5/00* (2006.01)
*H04L 5/14* (2006.01)

(52) U.S. Cl.
CPC ......... *H04W 72/082* (2013.01); *H04L 5/0057* (2013.01); *H04L 5/0073* (2013.01); *H04L 5/14* (2013.01)

(58) Field of Classification Search
CPC ...... H04B 7/022; H04B 17/24; H04B 17/309; H04B 17/345; H04W 72/082;
(Continued)

(56) References Cited

U.S. PATENT DOCUMENTS 9,408,121 B2 * 8/2016 Xiao ..................... H04W 36/30
2011/0237282 A1 * 9/2011 Geirhofer ............ H04B 7/0626
455/509

(Continued)

FOREIGN PATENT DOCUMENTS

TW 201810987 A 3/2018
WO WO2014130137 A1 8/2014
(Continued)

OTHER PUBLICATIONS

"International Application Serial No. PCT/US2016/029120, International Search Report dated Jan. 17, 2017", 8 pgs.
(Continued)

*Primary Examiner* — Marsha D Banks Harold
*Assistant Examiner* — Dharmesh J Patel
(74) *Attorney, Agent, or Firm* — Kowert, Hood, Munyon, Rankin & Goetzel, P.C.

(57) ABSTRACT

Devices and methods of providing joint scheduling in a full-duplex LTE system are generally described. The UE measures intra-cell interference at the UE caused by a UL transmission from each intra-cell UE, calculates a ratio of the intra-cell interference over an average inter-cell interference, determines whether the intra-cell UE is an aggressor or non-aggressor based on whether the ratio exceeds a threshold, transmits at least some of the determinations to the eNB as feedback, and communicates with the eNB based on a schedule that is dependent on the feedback such that the UE is neither an aggressor nor is subject to interference from aggressors. The schedule may also be based on wideband
(Continued)

CQI feedback based on a ratio of an average overall DL interference plus noise over the average inter-cell interference plus noise and/or subband CQI feedback based on SINR measurements.

21 Claims, 5 Drawing Sheets

(58) Field of Classification Search
CPC ......... H04W 72/1231; H04W 72/1278; H04W 88/085; H04J 11/005; H04J 11/0026; H04L 5/14; H04L 5/0057; H04L 5/0073
See application file for complete search history.

(56) References Cited

U.S. PATENT DOCUMENTS

2012/0327800 A1* 12/2012 Kim ................ H04J 11/005
370/252
2013/0044621 A1 2/2013 Jung et al.
2014/0105042 A1* 4/2014 Cui ................ H04B 17/26
370/252
2014/0328327 A1 11/2014 Xiao et al.
2015/0139292 A1 5/2015 Shirani-Mehr et al.

FOREIGN PATENT DOCUMENTS

WO WO-2015072903 A1 5/2015
WO WO-2015180773 A1 12/2015

OTHER PUBLICATIONS

"International Application Serial No. PCT/US2016/029120, Written Opinion dated Jan. 17, 2017", 4 pgs.

* cited by examiner

DEVICE AND METHOD FOR CQI FEEDBACK TO ENABLE JOINT DL-UL SCHEDULING IN FULL DUPLEX SYSTEMS

TECHNICAL FIELD

Embodiments pertain to radio access networks. Some embodiments relate to mitigating interference in cellular and wireless local area network (WLAN) networks, including Third Generation Partnership Project Long Term Evolution (3GPP LTE) networks and LTE advanced (LTE-A) networks as well as 4$^{th}$ generation (4G) networks and 5$^{th}$ generation (5G) networks.

BACKGROUND

With the increase in different types of devices communicating with various network device, usage of 3GPP LTE systems has increased. This has increased both the number of user equipment (UEs) and bandwidth used by these UEs with the advent of a multitude of disparate services. Due to their pervasiveness, especially in high-density limited mobility environments (such as indoor shops or malls), UEs are increasingly likely to be disposed proximate to each other for substantial amounts of time. This may, in turn, create an increased prospect of co-channel interference with other UEs. This may become even more problematic with the advent of full-duplex cellular systems, in which a UE may transmit and receive at the same time. In particular uplink transmissions at a particular UE in such environments are more likely to interfere with downlink transmissions of other nearby UEs. Moreover, downlink transmissions from nearby evolved NodeBs (eNBs) may also increase the amount of interference for uplink transmissions to a particular eNB. Although eNB-based interference may be much stronger due to the greater transmission power of eNBs compared with UEs, it may be desirable to mitigate both types of interference in LTE systems.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
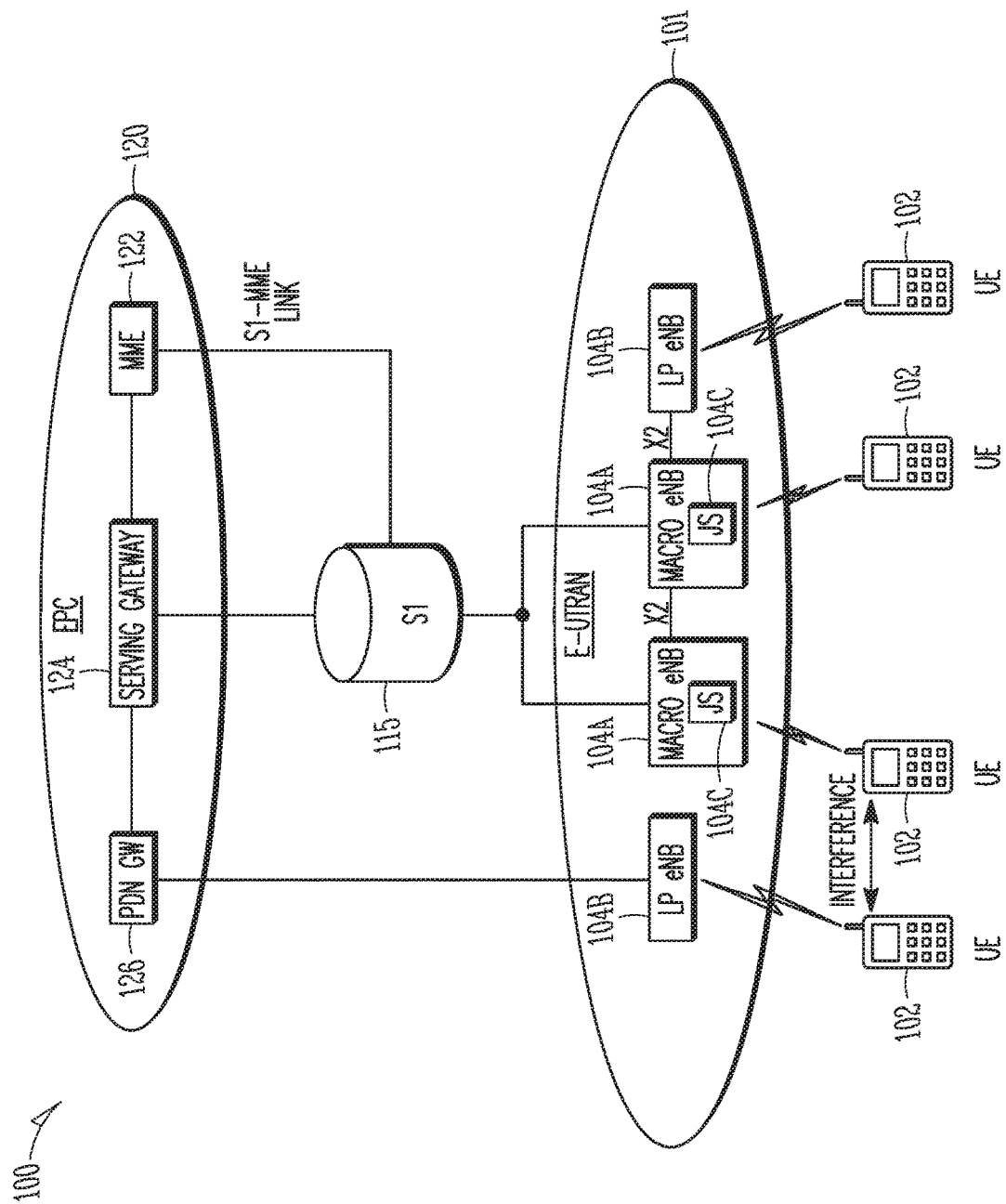
FIG. 1 is a functional diagram of a wireless network in accordance with some embodiments.

FIG. 1 shows an example of a portion of an end-to-end network architecture of a Long Term Evolution (LTE) network with various components of the network in accordance with some embodiments. As used herein, an LTE network refers to both LTE and LTE Advanced (LTE-A) networks as well as other versions of LTE networks to be developed. The network 100 may comprise a radio access network (RAN) (e.g., as depicted, the E-UTRAN or evolved universal terrestrial radio access network) 101 and core network 120 (e.g., shown as an evolved packet core (EPC)) coupled together through an S1 interface 115. For convenience and brevity, only a portion of the core network 120, as well as the RAN 101, is shown in the example.

The core network 120 may include a mobility management entity (MME) 122, serving gateway (serving GW) 124, and packet data network gateway (PDN GW) 126. The RAN 101 may include evolved node Bs (eNBs) 104 (which may operate as base stations) for communicating with user equipment (UE) 102. The eNBs 104 may include macro eNBs 104a and low power (LP) eNBs 104b. The eNBs 104 and UEs 102 may employ the techniques described herein. Some or all of the eNBs 104 may include a joint scheduler 104c. In some embodiments, for example, the low power eNB 104b may not perform joint scheduling, instead passing this functionality to a macro eNB 104a serving the same or overlapping area. The joint scheduling disclosed herein may be dependent on the number of UEs 102 being served by a particular eNB 104. Thus, for example, if a relatively few UEs 102 are present in the area serviced by an eNB 104 such that interference is unlikely to be an issue (or where the UEs 102 are moving quickly compared to the area), the eNB 104 may indicate for the UE 102 to avoid the interference measurement and calculation and transmission of the results to the eNB 104.

The MME 122 may be similar in function to the control plane of legacy Serving GPRS Support Nodes (SGSN). The MME 122 may manage mobility aspects in access such as gateway selection and tracking area list management. The serving GW 124 may terminate the interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes.

The PDN GW 126 may terminate a SGi interface toward the packet data network (PDN). The PDN GW 126 may route data packets between the EPC 120 and the external PDN, and may perform policy enforcement and charging data collection. The PDN GW 126 may also provide an anchor point for mobility devices with non-LTE access. The external PDN can be any kind of IP network, as well as an IP Multimedia Subsystem (IMS) domain. The PDN GW 126 and the serving GW 124 may be implemented in a single physical node or separate physical nodes.

The eNBs 104 (macro and micro) may terminate the air interface protocol and may be the first point of contact for a UE 102. In some embodiments, an eNB 104 may fulfill various logical functions for the RAN 101 including, but not limited to, RNC (radio network controller functions) such as radio bearer management, uplink and downlink dynamic radio resource management and data packet scheduling, and mobility management. In accordance with embodiments, UEs 102 may be configured to communicate orthogonal frequency division multiplexed (OFDM) communication signals with an eNB 104 over a multicarrier communication channel in accordance with an OFDMA communication technique. The OFDM signals may comprise a plurality of orthogonal subcarriers.

The S1 interface 115 may be the interface that separates the RAN 101 and the EPC 120. It may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells 104b may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or may operate on different frequency bands with each cell operating in a different frequency band or only cells of different sizes operating on different frequency bands. As used herein, the term LP eNB refers to any suitable relatively LP eNB for implementing a smaller cell (smaller than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB 104b might be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality. Thus, LP eNB may be implemented with a picocell eNB since it may be coupled to a macro eNB 104a via an X2 interface. Picocell eNBs or other LP eNBs LP eNB 104b may incorporate some or all functionality of a macro eNB LP eNB 104a. In some cases, this may be referred to as an access point base station or enterprise femtocell.

Communication over an LTE network may be split up into 10 ms frames, each of which may contain ten 1 ms subframes. Each subframe of the frame, in turn, may contain two slots of 0.5 ms. Each subframe may be used for uplink (UL) communications from the UE to the eNB or downlink (DL) communications from the eNB to the UE. In one embodiment, the eNB may allocate a greater number of DL communications than UL communications in a particular frame. The eNB may schedule transmissions over a variety of frequency bands ($f_1$ and $f_2$). The allocation of resources in subframes used in one frequency band and may differ from those in another frequency band. Each slot of the subframe may contain 6-7 OFDM symbols, depending on the system used.

The subframe may contain 12 subcarriers. A downlink resource grid may be used for downlink transmissions from an eNB to a UE, while an uplink resource grid may be used for uplink transmissions from a UE to an eNB or from a UE to another UE. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth. In Frequency Division Duplexed (FDD) mode, both the uplink and downlink frames may be 10 ms. In Time Division Duplexed (TDD), the uplink and downlink subframes may be transmitted on the same frequency and are multiplexed in the time domain. The duration of the resource grid 400 in the time domain corresponds to one subframe or two resource blocks. Each resource grid may comprise 12 (subcarriers) *14 (symbols)=168 resource elements.

There may be several different physical downlink channels that are conveyed using such resource blocks, including the physical downlink control channel (PDCCH) and the physical downlink shared channel (PDSCH). Each downlink subframe may be partitioned into the PDCCH and the PDSCH. The PDCCH may normally occupy the first two symbols of each subframe and carry, among other things, information about the transport format and resource allocations related to the PDSCH channel, as well as H-ARQ information related to the uplink shared channel. The PDSCH may carry user data and higher layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that indicate to the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

In addition to the PDCCH, an enhanced PDCCH (EPDCCH) may be used by the eNB and UE. Unlike the PDCCH, the EPDCCH may be disposed in the resource blocks normally allocated for the PDSCH. Different UEs may have different EPDCCH configurations that are configured via Radio Resource Control (RRC) signaling. Each UE may be configured with sets of EPDCCHs, and the configuration can also be different between the sets. Each EPDCCH set may have 2, 4, or 8 PRB pairs. In some embodiments, resource blocks configured for EPDCCHs in a particular subframe may be used for PDSCH transmission if the resource blocks are not used for the EPDCCH transmissions during the subframe.

Similarly, different physical uplink channels may include the Physical Uplink Control Channel (PUCCH) used by the UE to send Uplink Control Information (UCI) to the eNB and request a Physical Uplink Shared Channel (PUSCH) used to provide uplink data to the eNB. The PUCCH may be mapped to an UL control channel resource defined by an orthogonal cover code and two resource blocks, consecutive in time, with hopping potentially at the boundary between adjacent slots. The PUCCH may take several different formats, with the UCI containing information dependent on the format. Specifically, the PUCCH may contain a scheduling request (SR) used by the UE to request resources to transmit uplink data using PUCCH format 1. The PUCCH may also contain acknowledgement responses/retransmission requests (ACK/NACK) or a Channel Quality Indication (CQI)/Channel State Information (CSI). The CQI/CSI may indicate to the eNB an estimate of the current downlink channel conditions as seen by the UE to aid channel-dependent scheduling and, if one MIMO transmission mode is configured to the UE, may include MIMO-related feedback (e.g. Precoder matrix indication, PMI).

Reference signals using dedicated resources may be used for specific purposes in the LTE system. Downlink reference signals may include cell-specific reference signals (CRS), UE-specific channel state information reference signals (CSI-RS), and demodulation reference signals (DMRS); uplink reference signals may include sounding reference signals (SRS) and DMRS. Reference signals may be used to conduct channel estimation for uplink and downlink demodulation and decoding. For downlink communications, the reference signals may be used to estimate the downlink CSI, which is subsequently provided to the eNB; for uplink communications, the reference signals may be used to estimate the uplink CSI for the eNB to schedule uplink resource in next transmission opportunity. In addition, downlink CRS can be used for handover triggering by estimating path losses between the serving cell and neighbor cell.

Figure 2:
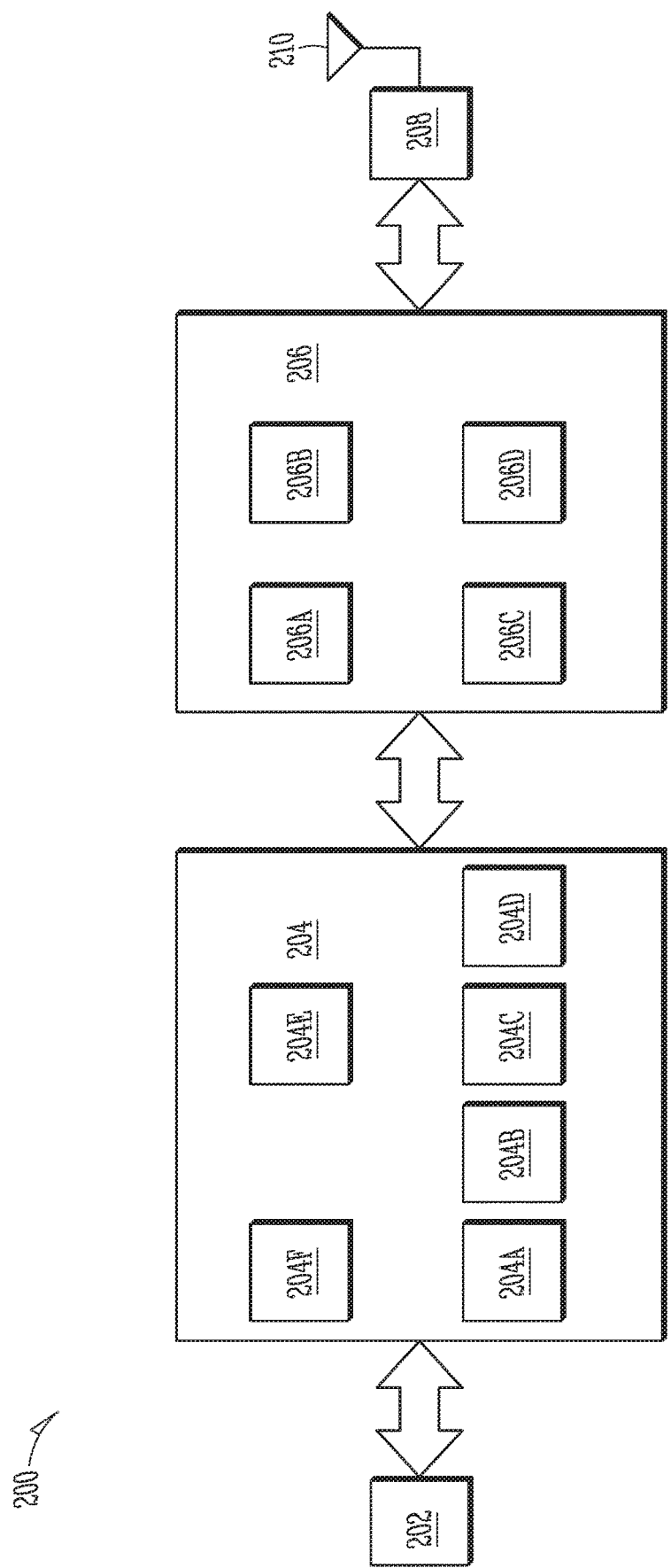
FIG. 2 illustrates components of a communication device in accordance with some embodiments.

Embodiments described herein may be implemented into a system using any suitably configured hardware and/or software. FIG. 2 illustrates components of a UE in accordance with some embodiments. At least some of the components shown may be used in an eNB or MME, for example, such as the UE 102 or eNB 104 shown in FIG. 1. The UE 200 and other components may be configured to use the synchronization signals as described to herein. The UE 200 may be one of the UEs 102 shown in FIG. 1 and may be a stationary, non-mobile device or may be a mobile device. In some embodiments, the UE 200 may include application circuitry 202, baseband circuitry 204, Radio Frequency (RF) circuitry 206, front-end module (FEM) circuitry 208 and one or more antennas 210, coupled together at least as shown. At least some of the baseband circuitry 204, RF circuitry 206, and FEM circuitry 208 may form a transceiver. In some embodiments, other network elements, such as the eNB may contain some or all of the components shown in FIG. 2. Other of the network elements, such as the MME, may contain an interface, such as the S1 interface, to communicate with the eNB over a wired connection regarding the UE.

The application or processing circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, and/or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include FFT, precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EU- TRAN) and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (WiMax), IEEE 802.11 wireless technology (WiFi) including IEEE 802.11 ad, which operates in the 60 GHz millimeter wave spectrum, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G. 5G, etc. technologies either already developed or to be developed.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted to signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the UE 200 may include additional elements such as, for example, memory/storage, display, camera, sensor, and/or input/output (I/O) interface as described in more detail below. In some embodiments, the UE 200 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 200 may include one or more user interfaces designed to enable user interaction with the system and/or peripheral component interfaces designed to enable peripheral component interaction with the system. For example, the UE 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 210 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210 may be effectively separated to take advantage of spatial diversity and the different channel characteristics that may result.

Although the UE 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media Some embodiments may include one or more processors and may be configured with instructions stored on a computer-readable storage device.

Figure 3:
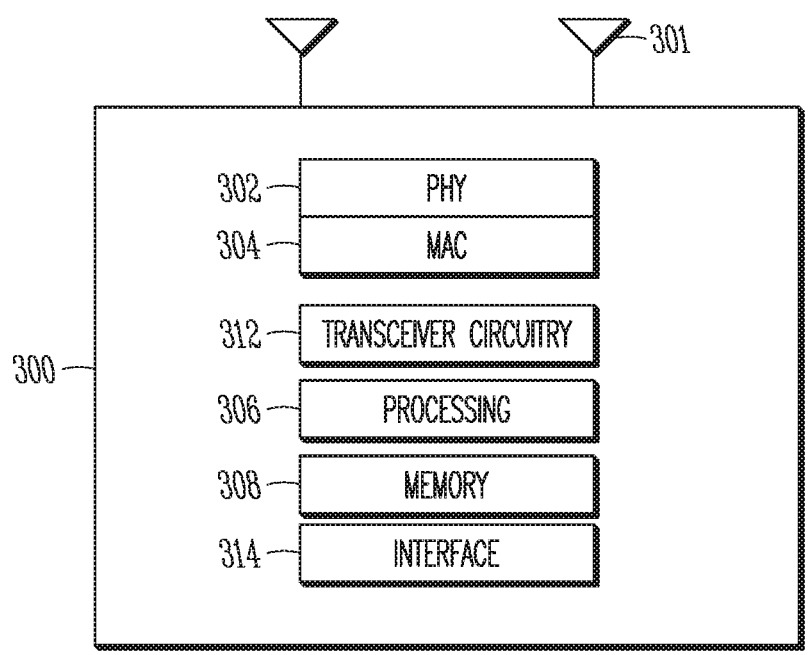
FIG. 3 illustrates a block diagram of a communication device in accordance with some embodiments.

FIG. 3 is a block diagram of a communication device in accordance with some embodiments. The device may be a UE or eNB, for example, such as the UE 102 or eNB 104 shown in FIG. 1 that may be configured to track the UE as described herein. The physical layer circuitry 302 may perform various encoding and decoding functions that may include formation of baseband signals for transmission and decoding of received signals. The communication device 300 may also include medium access control layer (MAC) circuitry 304 for controlling access to the wireless medium. The communication device 300 may also include processing circuitry 306, such as one or more single-core or multi-core processors, and memory 308 arranged to perform the operations described herein. The physical layer circuitry 302, MAC circuitry 304 and processing circuitry 306 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 300 can be configured to operate in accordance with 3GPP standards or other protocols or standards, including WiMax, WiFi, WiGig, GSM, EDGE, GERAN, UMTS, UTRAN, or other 3G, 3G, 4G, 5G, etc. technologies either already developed or to be developed. The communication device 300 may include transceiver circuitry 312 to enable communication with other external devices wirelessly and interfaces 314 to enable wired communication with other external devices. As another example, the transceiver circuitry 312 may perform various transmission and reception functions such as conversion of signals between a baseband range and a Radio Frequency (RF) range.

The antennas 301 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 301 may be effectively separated to take advantage of spatial diversity and the different channel characteristics that may result.

Although the communication device 300 is illustrated as having several separate functional elements, one or more of the functional elements may be combined and may be implemented by combinations of software-configured elements, such as processing elements including DSPs, and/or other hardware elements. For example, some elements may comprise one or more microprocessors. DSPs. FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

Figure 4:
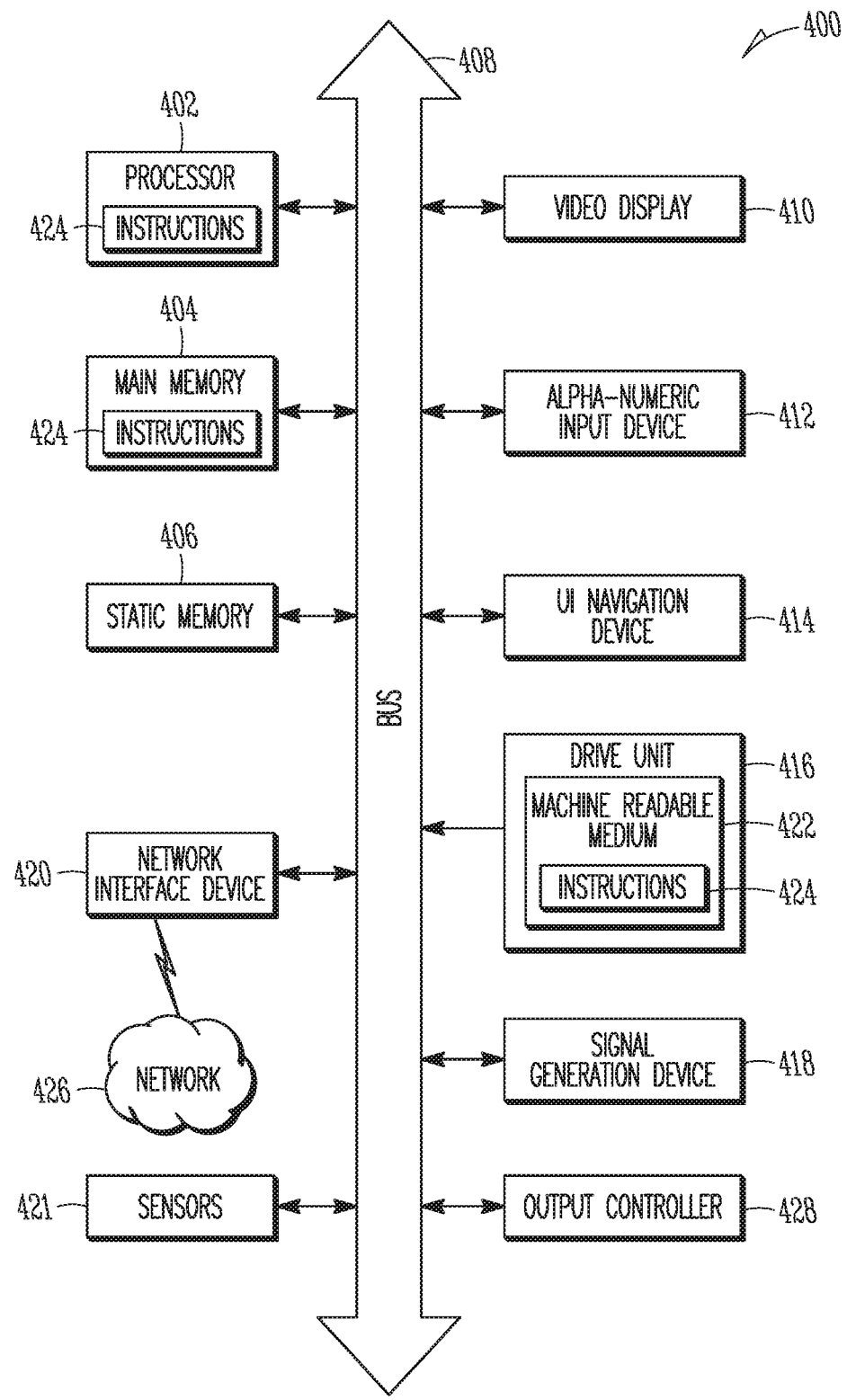
FIG. 4 illustrates another block diagram of a communication device in accordance with some embodiments.

FIG. 4 illustrates another block diagram of a communication device in accordance with some embodiments. In alternative embodiments, the communication device 400 may operate as a standalone device or may be connected (e.g., networked) to other communication devices. In a networked deployment, the communication device 400 may operate in the capacity of a server communication device, a client communication device, or both in server-client network environments. In an example, the communication device 400 may act as a peer communication device in peer-to-peer (P2P) (or other distributed) network environment. The communication device 400 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The communication device 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The communication device 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The communication device 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a communication device readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the communication device 400. In an example, one or any combination of the hardware processor 402, the main memory 404, the static memory 406, or the storage device 416 may constitute communication device readable media.

While the communication device readable medium 422 is illustrated as a single medium the term "communication device readable medium" may include a single medium or multiple media (e.g., a centralized or distributed database, and/or associated caches and servers) configured to store the one or more instructions 424.

The term "communication device readable medium" may include any medium that is capable of storing, encoding, or carrying instructions for execution by the communication device 400 and that cause the communication device 400 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), MIMO, or multiple-input single-output (MISO) techniques. In some examples, the network interface device 420 may wirelessly communicate using Multiple User MIMO techniques. The term "transmission medium" shall be taken to include any intangible medium that is capable of storing, encoding or carrying instructions for execution by the communication device 400, and includes digital or analog communications signals or other intangible medium to facilitate communication of such software.

As above, mitigation of interference mechanisms may be extremely beneficial in LTE communication systems, in particular as related to full-duplex communications, which support simultaneous transmission and reception in the same frequency at the same time. This increased interference is in part due to interference between the transmitter and receiver chains, as well as the increased amount of communications used by full-duplex communications as compared to half duplex communications, and the corresponding system coordination to be determined and effected to mitigate the increased interference level.

Full-duplex systems have more complicated interference environments than conventional half-duplex systems (TDD or FDD). The interference may, in particular, include both UE-to-UE interference at the downlink receiver and eNB-to-eNB interference in uplink receiver. For cellular systems such as LTE, UEs transmitting uplink signals may create co-channel interference to other uplink signals in other cells. For full-duplex cellular systems, uplink signals may also create UE-to-UE interference with nearby downlink signals. This may be most noticeable in areas of high congestion and relatively slowly-moving UEs. Cell edge UEs in high-density indoor environments, e.g. cafeteria, airport etc., may be particularly vulnerable to severe performance degradation caused by UE-to-UE interference. This vulnerability may exist because stationary (or nearly stationary) UEs in such environments are likely to transmit/receive persistently for long period of time, resulting in prolonged service disruption due to strong interference. Until properly handled, a service disruption caused by UE-to-UE interference in this scenario may thus substantially curtail the benefits of full-duplex capability.

Similarly, eNB-to-eNB interference, downlink transmission from neighboring eNBs, may impact uplink reception of the serving eNB in a full-duplex cellular system Since eNB-to-eNB interference has a relatively small pathloss compared to UE-to-UE interference, and the transmit power and antenna gain at the eNB is much larger than those of UE, the eNB-to-eNB interference may dominate the desired, but weak uplink signal. While eNB-to-eNB interference can be mitigated to a large extent using antenna nulling, UE-UE interference may remain an issue.

To this end, UE-UE interference and CSI feedback mechanisms may be provided in full-duplex cellular systems by considering both conventional co-channel and interference introduced by the use of full-duplex communications. The full-duplex feedback mechanisms may provide feedback of a UE-UE interference level with various granularities. The full-duplex feedback information may enable various joint full-duplex schedulers such as eNBs to perform simultaneous uplink and downlink UE transmissions. In some embodiments, non-coordinative schemes and/or the use of a coordinative joint scheduler in the eNB to intelligently schedule UEs with little expected UE-to-UE interference for simultaneous transmission and reception may be used to mitigate UE-to-UE interference. To accomplish this, the eNB may obtain and retain knowledge of the UE-to-UE interference, which may generally involve different procedural aspects. These procedural aspects may include pilot/beacon/reference signals transmitted from UE, the interference measurement method at the UE, and feedback mechanisms of UE-to-UE interference from the UE to the eNB.

In some embodiments discussed herein, specific reference signals and interference measurement methods may be used by the joint scheduler of a full-duplex cellular system In particular, the feedback mechanisms from the UE to the eNB for a joint scheduler are discussed herein. Specifically, methods to quantize the interference-level for per UL-DL pair after measurement are provided herein. The UE may provide the quantized interference-level information to the eNB. With such feedback information, the eNB can perform joint scheduling to schedule uplink and downlink UEs jointly in full-duplex systems and achieve high spectrum efficiency as demonstrated by simulation results.

Different feedback mechanisms and update rules may be established to provide the interference level of each UL-DL pair. The general criterion of the feedback information may be to support the joint scheduler to pair a downlink UE with an uplink UE for simultaneous transmission in the same resource blocks such that UE-to-UE interference is mitigated and high spectrum efficiency achieved for full-duplex cellular systems. The schedule indicating the resources to use for a requested UL transmission may be transmitted to each UE in a PDCCH for the UE. In some embodiments, a wideband feedback mechanism may be used that quantizes the wideband interference level per intra-cell UL-DL pair UE-UE interference with different granularities. The UE may provide feedback of this information periodically or aperiodically at a low frequency to the eNB.

In some embodiments, in addition to the wideband feedback, a subband feedback mechanism may be used that provides feedback per UL-DL pair CQI after measurement in each subband. In some embodiments, the existing subband CQI feedback mechanism in the LTE downlink may be reused to acquire new subband CQI feedback information specific to the full-duplex system Both the wideband and subband feedback information can be exploited at the full-duplex eNB for joint scheduling. The eNB may be able to leverage signaling complexity and scheduler accuracy flexibly via usage of one or both of the mechanisms to schedule UE pairs to transmit simultaneously.

In some embodiments the downlink UE may measure the instantaneous intra-cell UE-to-UE interference and determine the average inter-cell UE-to-UE interference for each UL-DL pair using a particular frame structure and reference signal design. The reference signal design in the full-duplex system may reuse the existing reference signals. In particular, a UE-UE interference measurement reference signal structure may be used for uplink to downlink per-pair interference measurement, where data transmission limited using the resource. The structure permits measurement of the interference from individual other intra-cell UL UEs and/or total or individual other inter-cell UL UEs due to full-duplex operation. The frame structure may include a reference signal supplied in the $6^{th}$ symbol of each subcarrier in each slot that also carries CRS or the $6^{th}$ and $7^{th}$ symbols of one (e.g., CSI-IM) or two subcarriers (Intra-UE IM-RS) in each slot that also carries CRS.

Methods to quantize and provide feedback as wideband interference-level per UL-DL pair are disclosed. The quantization may have different granularities. In various embodiments, the eNB may receive feedback of 1-bit or 2-bits per pair. In embodiments in which the eNB receives feedback of 1-bit per pair, the eNB may be able to determine whether or not the specific uplink UE is an interferer to the downlink UE. In embodiments in which the eNB receives feedback of 2-bits per pair, the eNB may be able to determine interferers to a finer degree, classifying the UE pairs into strong, weak and non-interferers. Such feedback information may help the eNB to generate a UL-DL pair table that can be used for joint scheduling.

As above, in this embodiment a 1-bit 0/1 UL-DL pair table may be created for each of the UL-DL UE pairs within the environment containing multiple UEs. In particular, the aggressors (interferers) and non-aggressors (non-interferers) for each downlink UE may be detected and provided using 1-bit feedback. Initially, to determine whether a particular UL UE is an aggressor of a particular DL UE, a threshold for quantization may be set. The quantization threshold for the UE may depend on characteristics of the UL and/or DL UE, such as mobility, transmission power, and type of the UE, the last of which may indicate whether the UE is, for example, a normal UE (such as a cell phone) or machine type communication (MTC) UE. In addition, the method of generating and updating a UL-DL pair table may be selected from a number of different techniques.

In some embodiments, the 1-bit threshold may use both the instantaneous intra (within the same cell) UE-UE interference as well as the average inter (from different cells) UE-UE interference, as provided in equation (1) below:

$$\frac{I_{intra-ue2ue}(DL\text{-}UE, UL\text{-}UE)}{E(I_{inter-ue2ue}(DL\text{-}UE))} \begin{cases} > \text{threshold, aggressor}('0') \\ \text{otherwise, non-aggressor}('1') \end{cases} \quad (1)$$

In equation (1), a ratio of the measured intra UE interference (i.e., the interference caused by a particular UL UE on a particular DL UE) to the value of the average inter UE interference at the DL UE may be compared to a predetermined threshold. The average inter UE interference at the DL UE may be a value that is expected based on one or more previous measurements of interference caused by a set of UL UEs at the DL UE. In some embodiments, the DL UE may use the average value calculated at the previous measurement period. In some embodiments, the DL UE may calculate the average value using the values measured at the present measurement period. In some embodiments, the DL UE may use a combination of the values measured at the present measurement period and one or more of the previous measurement periods, perhaps with the previous measurement periods weighted either uniformly or decreasing with increasing time. While all UL UEs for which interference is able to measured may be used to determine the average interference, in some embodiments, calculation of the average interference may be limited to a set of UL UEs. The set of UEs measured may include all UL UEs within a predetermined radius of the DL UE, and may be based on the mobility of the UL UEs. For example, the expected average interference may exclude the interference of those UEs previously measured but moving swiftly enough to exit the range of the DL UE the next time a measurement of the intra UE interference is made. The average interference value may also exclude the interference of UEs that are known to be in a dormant state (e.g., DRX or extended DRX state or in idle mode) at the next measurement time. In some embodiments, the DL UE may determine the set of UL UEs to measure or use to calculate the average value. In some embodiments, the eNB may indicate to the UE which UL UEs to use.

After the measurement of the UE-UE interference by each DL UE, based on the inter UE-UE interference, the DL UE may bitmap the ratio between the measured intra UE-UE and average inter UE-UE interference into either 0 or 1, depending on whether or not the threshold is met for each DL UE, UL UE pair. The threshold may be uniform throughout the cell, so that each DL UE provides uniform feedback.

Table 1 is an example of a wideband UL-DL pair table generated at the eNB containing the individual rows (or columns) generated by each DL UE. In Table 1, the '0' entry indicates that a (UL UE, DL UE) pair are not to be scheduled using the same resources, while '1' entry indicates that (UL UE, DL UE) can be paired for joint scheduling. Moreover, depending on the scheduler used at the eNB, additional per UL-DL pair channel quality indicator (CQI) feedback may be used for joint scheduling, as discussed in more detail below.

TABLE 1

| UL/DL (UE ID) | 1 | ... | $N_{UL}$ |
|---|---|---|---|
| 1 | 0 | ... | 1 |
| ... | | ... | ... |
| $N_{DL}$ | 1 | ... | 0 |

Table 1 may, in some embodiments, be square as each DL UE may also be an UL UE for another UE in the system. In equation (1), for a particular DL UE, 0 indicates that a particular UL UE is an aggressor to the particular DL UE (and thus 1 is a non-aggressor), although in other embodiments, equation (1) can be adjusted to indicate that 0 is a non-aggressor (and thus 0 is a non-aggressor. Table 1 may thus be adjusted accordingly. Each DL UE may itself perform the calculation for each UL UE and transmit at least the result of the calculation (0/1) in a feedback message. In embodiments in which a complete list of UL UE IDs and how the UL UE IDs are to be mapped in a feedback message to the eNB may have been broadcast by the eNB and known by all DL UEs, only the results may be transmitted in the feedback message in the specified order (e.g., UL UE ID1 first bit, UL UE ID2 second bit, etc. . . . ). In other embodiments, whether or not the list has been broadcast by the eNB, both results and UL UE IDs may be transmitted.

In some embodiments, the average inter eNB-UE may also be taken into account. This is to say that for the eNB to form the 1-bit table, the DL UE may not only measure the intra UE-UE interference but may determine whether or not the UL UE is an aggressor using the average inter UE-UE interference as well as the inter eNB-UE interference.

$$\frac{I_{intra\text{-}ue2ue}(DL\text{-}UE,\ UL\text{-}UE)}{E(I_{inter\text{-}ue2ue}(DL\text{-}UE))} \begin{cases} > \text{threshold, aggressor}('0') \\ \text{otherwise, non-aggressor}('1') \end{cases} \quad (2)$$

where the total expected average interference=the sum of the above interferences, i.e., $E(I_{inter}(DL-UE))=E(I_{inter\text{-}ue2ue}(DL-UE))+E(I_{inter\text{-}bs2ue}(DL-UE))$. Similar to the above, all UEs may be used or only some of the UEs may be used, as determined by the eNB. The ratio may be bitmapped, as above, into the column (or row) of a table to determine which UL UE, DL UE pairs are not to be scheduled using the same resources and which can be paired for joint scheduling. Depending on the scheduler used at the eNB, additional per UL-DL pair CQI feedback may be used for joint scheduling.

In some embodiments, the granularity of the results may be increased. This is to say that a 2-bit determination may be used for each UL-DL pair table, where the strong aggressors (strong interferers), weak aggressors (weak interferers) non-aggressors (non-interferers) for each downlink UE may be able to be stored. In a manner similar to the above, equation (3) illustrates one embodiment in which multiple thresholds may be used for each DL UE, UL UE pair.

$$\frac{I_{intra\text{-}ue2ue}(DL\text{-}UE,\ UL\text{-}UE)}{E(I_{inter\text{-}ue2ue}(DL\text{-}UE))} \begin{cases} > threshold_1, \text{ strong aggressor}('0') \\ < threshold_2, \text{ non-aggressor}('1') \\ \text{otherwise, weak aggressor}('2') \end{cases} \quad (3)$$

In equation (3), a ratio of the measured intra UE interference to the value of the average inter UE interference at the DL UE may be compared to multiple thresholds in a manner similar to that associated with Table 1. The average inter UE interference at the DL UE may be a value that is expected based on one or more previous measurements of interference caused by a set of UL UEs at the DL UE. As above, the thresholds may be uniform and may be supplied to the UEs by the eNB through RRC signaling or via system broadcast information. As indicated in equation (3), each downlink UE may measure the intra UE-UE interference and use the average inter UE-UE interference (measured by the DL UE or supplied by the eNB) to determine interference level of each UL UE. Specifically, the DL UE may bitmap the ratio between intra UE-UE and average inter UE-UE interference into 0, 1 or 2 using 2 bits, as shown in Table 2.

TABLE 2

| UL/DL (UE ID) | 1 | ... | $N_{UL}$ |
|---|---|---|---|
| 1 | 0 | ... | 2 |
| ... | | ... | ... |
| $N_{DL}$ | 1 | ... | 0 |

As indicated in equation (3), the '0' entry in Table 2 may indicate that a particular UL UE, DL UE pair are not to be scheduled using the same resources; a '1' entry indicates that the particular UL UE, DL UE pair can be paired for joint scheduling and the UL interference is sufficiently low to enable DL transmission to ignore UL interference and transmit without adjustment of the modulation and coding scheme (MCS) level adjustment; and a '2' entry indicates that the particular UL UE, DL UE pair may be scheduled using the same resources with the DL MCS adjusted based on the interference level from UL UE. Additional per subband CQI feedback may be used for pairs indicated as '2' as explained below. Note that while Table 2 may, like Table 1, be square, the values may not be symmetric. This is to say that one UE of a particular UL UE, DL UE pair may interfere to a greater extent than the other UE due to factors other than distance between the UEs, such as transmit power of each UE.

In a similar manner as above, the 2 bit result, and thus Table 2 may also take into account not only the intra UE-UE interference, but also the total inter-cell interference. Thus, as shown by equation (4):

$$\frac{I_{intra\text{-}ue2ue}(DL\text{-}UE,\ UL\text{-}UE)}{E(I_{inter\text{-}ue2ue}(DL\text{-}UE))} \begin{cases} > threshold_1, \text{ strong aggressor}('0') \\ < threshold_2, \text{ non-aggressor}('1') \\ \text{otherwise, weak aggressor}('2') \end{cases} \quad (4)$$

where the total expected average interference=the sum of the above interferences. $E(I_{inter}(DL-UE))=E(I_{inter\text{-}ue2ue}(DL-UE))+E(I_{inter\text{-}bs2ue}(DL-UE))$. All UEs may be used to fill the table, or only some of the UEs may be used, as determined by the eNB. The ratio may be bitmapped, into the column (or row) of the table.

The selection of the threshold for either UL-DL UE pair Table 1 (single bit feedback 0/1) or UL-DL UE pair Table 2 (multi-bit feedback 0/1/2) may depend on the actual deployment scenario, system requirements and the schedulers used for the full-duplex system. The eNB serving the UEs may supply the threshold(s) to the UEs. The eNB may use a global threshold or an individual threshold. In embodiments in which a global threshold is employed, each eNB may adopt the same threshold for generating a wideband UL-DL pair table based on overall network-wide long-term channel knowledge. In embodiments in which an individual threshold is used, each eNB may set an independent threshold for wideband UL-DL pair table based on cell long-term channel knowledge instead of, or in addition to, overall network-wide long-term channel knowledge.

As above, to generate the wideband UL-DL pair table, each DL UE provides feedback that may include the 1-bit/2-bit UE-UE interference level indicator of all possible UL UEs and the UL UE ID for each UL UE. The DL UE may be aware of UL UE ID from the reference signal used to determine the interference level. The DL UE may supply the 1-bit/2-bit per UL-DL pair feedback for all UL UEs in the same transmission opportunity. Alternatively, the DL UE may provide 1-bit/2-bit feedback of the UE-UE interference measured from recent subframes and let the eNB determine the corresponding UL UEs from the scheduling decisions of the eNB. The wideband feedback information can be updated periodically or aperiodically at relatively low frequency. The frequency may be based on eNB request and configuration (e.g., every 40/80/160 milliseconds).

Several rules may be applied to update the wideband UL-DL pair table. In the first update rule, the UE may use the instantaneous measurement to update the intra-cell UE-UE interference and use a moving average method to update the inter-cell interference. The DL UE may bitmap the interference ratio based on the updated interference as indicated by the mechanism given above. In a second update rule, the eNB may initially set the values in the UL-DL pair table to all '1's. In this case, initially every UL UE is able to be paired with every DL UE in the cell. The DL UE may subsequently obtain the interference (intra UE and/or inter cell) over a predetermined period of time. Based on the observation, statistical signal processing techniques such as maximum likelihood, K-means clustering or other machine learning techniques can be used to detect aggressors for the DL UE. The DL UE may subsequently provide a feedback of '0' if an aggressor is detected to update the UL-DL pair table at the eNB. In various embodiments, the UE may continue to provide feedback to indicate the presence of only a new aggressor, to indicate the presence of all aggressors, and/or to indicate a change (e.g., non-aggressor to aggressor) of a previously determined UL UE at the interference measurement time.

The eNB may reset some or all of the UL-DL pair table periodically. This may occur at predetermined times or may be indicated to the UE via RRC signaling, for example. After the reset, some or all of the DL UEs may repeat the update process. For example, certain UEs may be isolated and thus may not be subject to interference, in which case battery life of these UEs and network resources may be saved by allowing these UEs to avoid transmitting an update. The eNB may trigger the DL UEs to update the reset table by transmitting an indication via predetermined resources or the update may triggered automatically periodically based on timing.

In some embodiments, the above approaches are not limited to intra-cell UE-to-UE interference feedback. If coordination between eNBs is enabled, such as in a Coordinated Multipoint (CoMP) system, a UL-DL bitmap table containing inter-cell UE pair information may be shared among the eNBs. With this interference-level feedback information, joint inter-cell scheduling in addition to joint intra-cell scheduling may be performed.

In addition to the wideband UL-DL pair table above, multi-bit wideband per UL-DL pair differential CQI feedback may be employed. Such feedback can delineate per UL-DL pair UE-UE interference level at a finer scale using a larger number of bits. This feedback can be used together with subband feedback mechanism discussed below to achieve good complexity and performance tradeoff. Use of multi-bit wideband differential CQI feedback enables characterization of the CQI degradation for each UL-DL pair for joint scheduling in a full-duplex cellular system. Wideband CQI degradation may be defined as the ratio between the average overall downlink interference plus noise over the average inter-cell interference plus noise. The average intra- and inter-cell interference can be computed using a moving-average after measurement, as indicated above. The CQI degradation may be quantized from 0 to $2^{N_b}-1$ using $N_b$ bits, as indicated in equation (4):

$$CQI \text{ degradation } (DL\text{-}UE, UL\text{-}UE) = \frac{E(I_{intra\text{-}ue2ue}(DL\text{-}UE, UL\text{-}UE)) + E(I_{inter}(DL\text{-}UE)) + N}{E(I_{inter}(DL\text{-}UE)) + N} \in [0, 2^{N_b} - 1] \quad (4)$$

The differential CQI can also be quantized in some embodiments using a variable number of bits. The wideband CQI differential values can be used at the eNB to adjust the CQI level for joint scheduling and rate adaption (the MCS). The eNB may subtract the wideband CQI differential value from the subband CQI value to obtain a more accurate CQI level. A higher wideband CQI differential value per UL UE, DL UE pair may indicate that the DL UE is likely to experience a stronger interference from the paired UL UE. The pairing of the UL UE, DL UE for joint scheduling using the same resources may thus result in a degraded subband CQI for the DL UE. On the other hand, if the CQI differential value is low for the UL UE, DL UE pair, the subband CQI value of the DL UE may not be degraded for scheduling and rate adaption.

Multi-bit wideband per UL-DL pair differential CQI feedback may be used in addition to the wideband UL-DL pair table to achieve a CQI feedback strategy. The UE can choose to first feedback the 1-bit/2-bit information used in the table and then feedback the wideband CQI degradation only for non-aggressor UEs ('1') of 1-bit feedback systems or weak aggressor UE ('2') of 2-bit feedback systems. This is similar to variable bit quantization of differential CQI feedback. As above, the DL UE can feedback the wideband UL-DL per pair differential CQI periodically or aperiodically at relative low frequency (compared to the subband CQI feedback) based on the eNB request and configuration (e.g., every 40/80/160 milliseconds etc.).

Moreover, in some embodiments, subband per UL-DL pair CQI feedback may be used. In existing LTE systems, several consecutive PRBs may be grouped together as one scheduling resource labeled as subband. The subband CQI feedback mechanism used in the LTE downlink may be reused to feedback a subband per UL-DL pair CQI specific to the full-duplex system for joint scheduling. Based on scheduling algorithms, the DL UE may be able to feedback one of the following subband signal-to-interference and noise ratios (SINR) types and quantize the SINR with M-bits to obtain the subband CQI feedback. While M can equal 4, unlike LTE systems in some embodiments M can take other values. Various types of subband per UL-DL pair CQI feedback may be used. Type 1 subband per UL-DL pair CQI feedback is shown by equation (5):

$$SINR (DL\ UE, UL\ UE_{sched}) = \frac{\text{Signal } (DL\ UE)}{I_{intra\text{-}ue2ue}(DL\ UE, UL\ UE_{sched}) + I_{inter\text{-}ue2ue}(DL\text{-}UE) + I_{eNB}(DL\text{-}UE) + N}, \quad (5)$$

In equation (5), a single subband SINR is determined with respect to interference between the DL UE and the scheduled UL UE ($I_{intra\text{-}ue2ue}$(DL UE, UL UE$_{sched}$)), taking into account all inter-cell UE-to-UE interference ($I_{inter\text{-}ue2ue}$ (DL–UE)) and conventional downlink interference ($I_{eNB}$ (DL–UE)+N'). The SINR in equation (5) may thus be computed based on the actual interference with the scheduled UL-DL pair. This SINR can be used jointly with the wideband UL-DL pair table for joint scheduling.

Type 2 subband per UL-DL pair CQI feedback is shown in equation (6):

$$SINR\ (DL\ UE) = \frac{Signal\ (DL\ UE)}{I_{inter\text{-}ue2ue}(DL-UE) + I_{eNB}(DL\text{-}UE) + N}, \quad (6)$$

In equation (6), a single subband SINR is determined with respect to interference the overall inter-cell interference. In calculating the SINR when using equation (6), the eNB may avoid consideration of intra-cell UE-UE interference. This subband SINR can be used together with the above wideband per pair CQI differential feedback for joint scheduling. The eNB may compute the CQI by subtracting the wideband CQI degradation from the subband SINR as follows:

$$dB\left(\frac{Signal\ (DL\ UE)}{I_{inter\text{-}ue2ue}(DL-UE) + I_{eNB}(DL\text{-}UE) + N}\right) - \quad (7)$$
$$dB\left(\frac{E(I_{intra\text{-}ue2ue}(DL\text{-}UE,\ UL\text{-}UE)) + E(I_{inter}(DL\text{-}UE)) + N}{E(I_{inter}(DL\text{-}UE)) + N}\right).$$

Equation (8) provides Type 3 subband per UL-DL pair CQI feedback:

$$SINR\ (DL\ UE,\ UL\ UE_{A/B/C/\ldots}) = \quad (8)$$
$$\frac{Signal\ (DL\ UE)}{I_{intra\text{-}ue2ue}(DL\ UE,\ UL\ UE_{A/B/C/\ldots}) + I_{inter\text{-}ue2ue}(DL\text{-}UE) + I_{eNB}(DL\text{-}UE) + N},$$

Thus, per UL-DL pair SINR may be determined with respect to interference between the DL UE and each UL UE, in addition to all inter-cell UE-to-UE and conventional downlink interference. With the full per UL-DL pair SINR, the use of wideband feedback information for joint scheduling may be avoided. However, the signaling overhead when using Type 3 feedback may be high if the subband SINR for all possible UL-DL pairs is provided. This may be reduced when used in conjunction with the wideband 1-bit or 2-bit per UL-DL pair information to reduce overhead. For example, with the 0/1 UL-DL pair table, the UE can avoid being paired with aggressors ('0'), and the feedback may thus be limited to only Type 3 feedback when paired with non-aggressors ('1'). Similarly, using the 0/1/2 pair table, the UE may only provide Type 3 feedback when paired with weak-aggressors ('2') and provide Type 1 feedback when paired with non-aggressors ('1').

The subband CQI feedback of Types 1 and 2 for full-duplex cellular system may use the same amount of overhead as the existing LTE system (assuming M=4). Thus, each DL UE may provide one CQI when Type 1 and 2 subband CQI feedback is used. In contrast, the amount of feedback overhead may be higher when Type 3 subband CQI feedback is used as the overhead may be proportional to the number of UL UEs in the cell.

The periodicity of reporting of the full-duplex subband CQI feedback may be set as desired by the eNB. In some embodiments, the periodicity may be the same as the periodicity used in conventional LTE DL CQI feedback. The subband CQI feedback, however, may be more frequent than the above wideband feedback.

As an example, Table 3 shows the performance simulation results and signaling overhead calculations using a LTE small cell system level simulator. In Table 3 and the simulations, a throughput gain over a 10 MHz FDD system (20 MHz spectrum in total) included a total of 20 subbands, 10 DL UE, and 10 UL UE per cell with subband CQI periodicity=5 ms, wideband periodicity=160 ms were used. $M=N_b=4$ bits per CQI were also used for the above wideband per UL-DL pair differential CQI feedback (indicated as contribution 2 in Table 3) and subband per UL-DL pair CQI feedback (indicated as contribution 3 in Table 3) mechanisms (the wideband UL-DL pair feedback is indicated as contribution 1 in Table 3). The results show that joint schedulers that have various additional feedback information all perform significantly better in terms of throughput compared to a naïve scheduler in which no UE-to-UE interference information is considered (e.g., TYPE1 SINR (DL UE, UL $UE_{sched}$) above).

TABLE 3

Signaling Overhead Comparison Example

| CQI feedback method | Description | Signaling Overhead | Signaling overhead example per DL UE pair |
|---|---|---|---|
| TYPE3 of Contribution 3 | full subband per pair CQI | Highest: 4-bit per DL-UL pair per subband | 11 × 20 × 4 = 880 bits |
| Contribution 1 + subset of TYPE3 of contribution 3 | WB 1 bit per pair + reduced subband CQI table | High: α*4-bit per DL-UL pair per subband + 1 bit WB per pair | 792 (with α = 0.9) bits per 5 ms + 10 bits per 160 ms |
| Contribution 1 + subset of TYPE3 of contribution 3 | WB 2 bit per pair + reduced subband CQI table | Medium: β*4-bit per DL-UL pair per subband + 2 bit WB per pair | 352 (with β = 0.4) bits per 5 ms + 2*10 = 20 bits per 160 ms |
| Contribution 1 + TYPE1 of contribution 3 | WB 1 bit per pair + single subband CQI | Low: 4-bit per DL UE per suband, + 1 bit WB per pair | 4*20 = 80 bits per 5 ms + 10 bits per 160 ms |
| Contribution 2 + TYPE1 of contribution 3 | WB 4 bit per pair + single subband CQI | Low: 4-bit per DL UE per suband, + 4 bit WB per pair | 4*20 = 80 bits per 5 ms + 40 bits per 160 ms |
| TYPE1 of Contribution 3 | Single subband CQI | Lowest: 4-bit per DL UE per subband | 4 × 20 = 80 bits per 5 ms |
| Conventional LTE | Subband CQI | Lowest: 4-bit per DL UE per subband | 4 × 20 = 80 bits per 5 ms |

The simulations show that a joint scheduler that has the full subband per UL-DL pair CQI feedback information (SINR (DL UE, UL $UE_{A/B/C/}$ . . . ) of TYPE3 may perform the best among all joint schedulers using different contributions and types. A joint scheduler that has wideband 1-bit/2-bit/4-bit per UL-DL pair feedback and a reduced subband per pair CQI performs close to the joint scheduler that has the full subband per UL-DL pair CQI feedback information, yet with different level of signaling overhead reduction. The simulations also illustrate that providing feedback having intra-cell UE-to-UE interference information may permit the full-duplex cellular system to achieve close to theoretical spectrum efficiency improvement. By leveraging different levels of knowledge regarding the UE-to-UE interference, the joint scheduler can be adapted to different deployment scenarios and achieve best performance and measurement/feedback complexity tradeoff.

Figure 5:
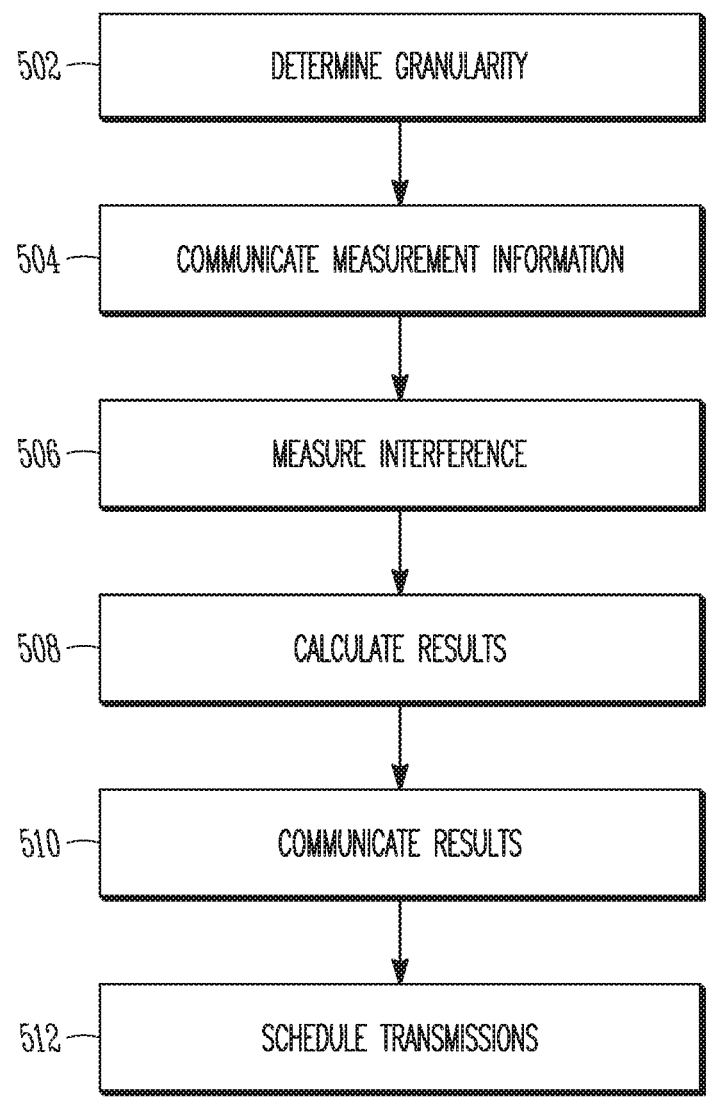
FIG. 5 illustrates a method of scheduling transmissions in a full-duplex system according to some embodiments.

Thus, CQI Feedback may be indicated by $SINR=P_{signal}/(P_{noise}+P_{interference})$ where $P_{interference}$ is the exact interference power measured at the current resource block. In a conventional half-duplex system, the only interference is from neighboring eNB, $P_{interference}=P_{eNB-interference}$. In a full-duplex system, UL UEs may interfere with DL transmissions to the UE, so $P_{interference}=P_{eNB-interference}+P_{UE-interference}$. $P_{UE-interference}$ may originate come from UL UEs served by the same eNB as the DL UE, $P_{interUE-interference}$, and/or UL UE served by a different eNB from the DL UE, $P_{interUE-interference}$. That is, $P_{UE-interference}=P_{intraUE-interference}+P_{intraUE-interference}$. Joint-scheduling at the serving eNB may schedule DL UE transmissions with UL UEs that only contribute marginal $P_{intraUE-interference}$ to the DL UE. This contribution focuses on what kind of information the DL UE provides as feedback to the eNB to indicate how strong $P_{intraUE-interference}$ is compared with $P_{eNB-interference}+P_{interUE-interference}$ (interference that may not be able to be managed by the serving eNB). For example, the DL UE may provide per sub-band CQI of the SINR of only inter-cell interference $(P_{eNB-interference}+P_{interUE-interference})$ and a wide-band CQI degradation indicator of each potential UL UE with longer feedback period. That is, for sub-band CQI; $SINR_{interonly}=P_{signal}/(P_{noise}+P_{eNB-interference}+P_{interUE-interference})$. For each UL UE, the CQI degradation feedback may be $DCQI_{ULUE}=(P_{noise}+P_{eNB-intereference}+P_{interUE-interference}+P_{ULUE-interference})/(P_{noise}+P_{eNB-interference}+P_{interUE-interference})$. The actual SINR for the DL UE when paired with the above UL UE can be computed as $SINR_{ULUE}=P_{signal}/(P_{noise}+P_{eNB-interference}+P_{interUE-interferece}+P_{ULUE-interference}))=SINR_{interonly}/DCQI_{ULUE}$. In dB: $SINR_{interonly}(dB)-DCQI_{ULUE}(dB)$ FIG. 5 illustrates a method of scheduling transmissions in a full-duplex system according to some embodiments. The method depicted in the flowchart may be used by the UE and eNB shown in FIGS. 1-4. Not all of the operations shown in FIG. 5 may occur. Moreover, some of the operations may occur at the UE while others occur at the eNB. Embodiments of the method may thus include additional or fewer operations or processes in comparison to what is illustrated in FIG. 5. In addition, embodiments of the method are not necessarily limited to the chronological order that is shown in FIG. 5. The method may be practiced with suitable systems, interfaces and components. In addition, while the method and other methods described herein may refer to UEs and eNBs operating in accordance with 3GPP or other standards, embodiments of those methods are not limited to just those UEs and eNBs and may also be practiced on other mobile devices. Some of the operations may be performed by the eNB, while others are performed by the UE.

At operation 502, the eNB may determine the granularity of the desired interference-level feedback for full duplex communications. In some situations, for example, with few UEs present in the cell, the eNB may determine that measurement and feedback of an enhanced level of granularity of either or both the intra or inter-cell UE feedback may be avoided. In other situations, for example at cell edges and/or environments in which a sufficiently large number of UEs coexist in a relatively small area for a significant amount of time the additional inference information may be deemed useful.

Once the desired level of granularity has been determined by the eNB, at operation 504 the eNB may transmit measurement information to the UE. The measurement information may include the frame structure and reference signal design for the various interference measurements for the UE to take. The measurement information may also indicate the granularity of the measurement, e.g., whether the UE is to determine merely whether a particular UE is or is not an interferer or whether the UE is to determine additionally the level of interferer for the particular UE. In some embodiments the eNB may transmit the measurement information in higher level signaling, such as RRC signaling or system information broadcasts. In other embodiments, the eNB may use UE-specific signaling to limit the number of UEs transmitting or measuring in cases in which, for example, only some of the UEs in the cell use full-duplex communications.

At operation 506, after having received the measurement information from the eNB, the UE may proceed to measure the interference via the indicated reference signals. The UE may measure either, some or all the wideband UL-DL interference, the wideband per UL-DL pair differential CQI and the subband per UL-DL CQI. The UE may measure intra and inter UE-UE interference and the CQI.

Having measured the interference and reference signal information, the UE may at operation 508 perform various calculations related to the measurements based on the measurement information. The UE may in some embodiments compare the intra UE-UE interference to the average or total inter UE-UE interference to determine for each UE which other UEs are aggressors and perhaps the level of aggression. The UE may in some embodiments calculate the wide-band CQI degradation, i.e., the ratio of the average over all downlink interference plus noise over the average inter-cell interference plus noise. The UE may in some embodiments calculate various types of subband CQI.

Having calculated the one or more types of interference feedback, the UE may proceed to use various thresholds to determine the aggressor level of each other UE. At operation 510, the UE may provide these aggressor levels (single bit (yes/no) or multi-bit (yes/no/level)), as well as the CQI feedback to the eNB. The UE may provide this information periodically, at scheduled times, or aperiodically. The feedback timing may be provided by the eNB. e.g., as above using higher level (e.g., RRC) signaling or system information transmissions.

The eNB may subsequently coordinate the indicated aggressor levels for each UE with regard to each other UE from each UE. In some embodiments, the eNB may tabulate the aggressor levels and CQI feedback. The eNB may subsequently, at operation 512, determine scheduling for uplink and downlink transmissions for each UE based on the aggressor levels and CQI feedback to minimize interference between the UEs when full duplex communications are used.

Example 1 is an apparatus of user equipment (UE) comprising: a memory, and processing circuitry arranged to: measure intra-cell interference at the UE caused by an uplink (UL) transmission from a plurality of intra-cell UEs; calculate, for at least some of the plurality of intra-cell UEs, a ratio of the intra-cell interference over an average inter-cell interference, and make a determination of which of an aggressor and a non-aggressor a particular intra-cell UE is based on whether the ratio exceeds a predetermined threshold; generate feedback comprising at least some of the determinations for transmission to an evolved NodeB (eNB); and decode a downlink (DL) transmission comprising one of: data transmitted in resource blocks simultaneously with UL transmissions in the resource blocks, the UL transmissions comprising UL transmissions of intra-cell UEs determined to be non-aggressors and free from UL transmissions of intra-cell UEs determined to be aggressors, or resource blocks for a UL transmission scheduled for simultaneous transmission DL transmissions in the resource blocks, the DL transmissions comprising DL transmissions of intra-cell UEs for which the UE is determined to be a non-aggressor and free from DL transmissions of intra-cell UEs for which the UE is determined to be an aggressor.

In Example 2, the subject matter of Example 1 optionally includes that the average inter-cell interference comprises an average inter-cell interference of inter-cell UEs with the UE.

In Example 3, the subject matter of Example 2 optionally includes that the average inter-cell interference comprises an average inter-cell interference of neighboring eNBs with the UE.

In Example 4, the subject matter of any one or more of Examples 1-3 optionally include, further comprising: baseband circuitry arranged to one of periodically or aperiodically generate an update of the feedback for transmission to the eNB.

In Example 5, the subject matter of any one or more of Examples 1-4 optionally include that the feedback for each intra-cell UE comprises a single bit that indicates whether the intra-cell UE is an aggressor or a non-aggressor.

In Example 6, the subject matter of any one or more of Examples 1-5 optionally include that the feedback for each intra-cell UE comprises multiple bits that indicate which of a non-aggressor, a weak aggressor and a strong aggressor is the intra-cell UE.

In Example 7, the subject matter of Example 6 optionally includes, wherein the processing circuitry is further arranged to: generate additional feedback comprising per subband channel quality indicator (CQI) information when the feedback indicates a weak aggressor, the DL transmission comprising the one of the data and resource blocks for the UL transmission dependent on the CQI information for weak aggressors.

In Example 8, the subject matter of any one or more of Examples 1-7 optionally include that the feedback is one of: all of the determinations, the determinations of intra-cell UEs that are aggressors and free from the determinations of intra-cell UEs that are non-aggressors, the determinations of intra-cell UEs that are non-aggressors and free from the determinations of intra-cell UEs that are aggressors, or the least of the determinations of intra-cell UEs that are aggressors and the determinations of intra-cell UEs that are non-aggressors.

In Example 9, the subject matter of any one or more of Examples 1-8 optionally include that the predetermined threshold for each intra-cell UE is dependent on at least one of mobility, transmission power, or type of at least one of the UE and the intra-cell UE.

In Example 10, the subject matter of any one or more of Examples 1-9 optionally include that the processing circuitry is further arranged to: calculate a ratio of an average overall DL interference plus noise over the average inter-cell interference plus noise to determine wideband channel quality indicator (CQI) degradation, the average overall DL interference comprising an average intra-cell interference plus the average inter-cell interference, and generate wideband CQI feedback comprising quantization of the CQI degradation for transmission to the eNB, and the DL transmission comprising the one of the data and resource blocks for the UL transmission is dependent on the wideband CQI feedback.

In Example 11, the subject matter of Example 10 optionally includes that the feedback for each intra-cell UE comprises multiple bits that indicate which of a non-aggressor, a weak aggressor and a strong aggressor is the intra-cell UE, and the processing circuitry is further arranged to limit the wideband CQI feedback to at least one of the non-aggressors and weak aggressors.

In Example 12, the subject matter of any one or more of Examples 10-11 optionally include that the processing circuitry is further arranged to: select one of a plurality of signal-to-interference and noise ratios (SINR) for each intra-cell UE, measure the selected SINRs, and generate subband CQI feedback by quantization of the selected SINRs, and the DL transmission comprising the one of the data and resource blocks for the UL transmission is dependent on the subband CQI feedback.

In Example 13, the subject matter of any one or more of Examples 1-12 optionally include that the processing circuitry is further arranged to: select one of a plurality of signal-to-interference and noise ratios (SINRs), measure the selected SINR for each intra-cell UE, and generate subband channel quality indicator (CQI) feedback by quantization of the selected SINRs, and the DL transmission comprising the one of the data and resource blocks for the UL transmission is dependent on the subband CQI feedback.

In Example 14, the subject matter of Example 13 optionally includes, wherein the SINR is selected from a plurality of types comprising: Type 1: a ratio of a DL signal on a subband over intra-cell interference caused by a UL transmission by an intra-cell UE that simultaneously transmits on the subband, overall inter-cell interference, DL interference from neighboring eNBs and noise, Type 2: a ratio of the DL signal over the overall inter-cell interference, DL interference from neighboring eNBs and noise, and Type 3: a ratio of the DL signal over intra-cell interference for each intra-cell UE, the overall inter-cell interference, DL interference from neighboring eNBs and noise.

In Example 15, the subject matter of any one or more of Examples 1-14 optionally include, further comprising: an antenna configured to provide communications between the UE and the eNB.

Example 16 is an apparatus of an evolved NodeB (eNB) comprising: a memory; and processing circuitry arranged to: detect feedback from a plurality of intra-cell user equipment (UEs), the feedback from one of the intra-cell UEs comprising a determination for at least some other intra-cell UEs, each determination indicating whether a ratio of intra-cell interference during a downlink (DL) transmission caused by an uplink (UL) transmission for an associated other intra-cell UE over an average inter-cell interference exceeds a predetermined threshold, another intra-cell UE for which the ratio exceeds the predetermined threshold being an aggressor for the one of the intra-cell UEs and otherwise being a non-aggressor; and schedule joint transmissions for the one of the intra-cell UEs based on the feedback such that the one of the intra-cell UEs is neither an aggressor nor is subject to interference from aggressors.

In Example 17, the subject matter of Example 16 optionally includes that the feedback for each intra-cell UE and other intra-cell UE interaction comprises a single bit that indicates whether the other intra-cell UE is an aggressor or a non-aggressor for the intra-cell.

In Example 18, the subject matter of any one or more of Examples 16-17 optionally include that the feedback for each intra-cell UE and other intra-cell UE interaction comprises multiple bits that indicate which of a non-aggressor, a weak aggressor and a strong aggressor the other intra-cell UE is in relation to the intra-cell UE.

In Example 19, the subject matter of Example 18 optionally includes that the feedback further comprises per subband channel quality indicator (CQI) information when the feedback indicates a weak aggressor, and the schedule for weak aggressors is dependent on the CQI information while the schedule for strong aggressors and non-aggressors is independent of the CQI information.

In Example 20, the subject matter of any one or more of Examples 18-19 optionally include that the feedback further comprises, for each intra-cell UE, a wideband channel quality indicator (CQI) of a quantized ratio of an average overall DL interference plus noise over the average inter-cell interference plus noise, the average overall DL interference comprising an average intra-cell interference from other intra-cell UL UEs plus the average inter-cell interference, and the schedule for weak aggressors is dependent on the wideband CQI feedback.

In Example 21, the subject matter of Example 20 optionally includes that the wideband CQI feedback is limited to at least one of the non-aggressors and weak aggressors.

In Example 22, the subject matter of any one or more of Examples 16-21 optionally include that the feedback for each intra-cell UE is one of the determinations for all of the other intra-cell UEs, the determinations of the other intra-cell UEs that are aggressors and free from the determinations of the other intra-cell UEs that are non-aggressors, the determinations of the other intra-cell UEs that are non-aggressors and free from the determinations of the other intra-cell UEs that are aggressors, or the least of the determinations of the other intra-cell UEs that are aggressors and the determinations of the other intra-cell UEs that are non-aggressors.

In Example 23, the subject matter of any one or more of Examples 16-22 optionally include that the feedback further comprises, for each intra-cell UE, subband channel quality indicator (CQI) feedback comprising a quantization of one of a plurality of signal-to-interference and noise ratios (SINR) for each other intra-cell UE, and the schedule is dependent on the subband CQI feedback.

In Example 24, the subject matter of Example 23 optionally includes, wherein the SINR is one of: Type 1: a ratio of a DL signal on a subband over intra-cell interference caused by a UL transmission by an intra-cell UE that simultaneously transmits on the subband, overall inter-cell interference, DL interference from neighboring eNBs and noise, Type 2: a ratio of the DL signal over the overall inter-cell interference, DL interference from neighboring eNBs and noise, or Type 3: a ratio of the DL signal over intra-cell interference for each intra-cell UE, the overall inter-cell interference, DL interference from neighboring eNBs and noise.

In Example 25, the subject matter of any one or more of Examples 16-24 optionally include that the feedback further comprises, for each intra-cell UE, a wideband channel quality indicator (CQI) of a quantized ratio of an average overall DL interference plus noise over the average inter-cell interference plus noise, the average overall DL interference comprising an average intra-cell interference from other intra-cell UL UEs plus the average inter-cell interference, and the processing circuitry is further arranged to subtract the wideband CQI feedback from the subband CQI feedback to provide a CQI value used for the schedule.

In Example 26, the subject matter of any one or more of Examples 16-25 optionally include that the predetermined threshold is uniform throughout the cell.

Example 27 is a computer-readable storage medium that stores instructions for execution by one or more processors of user equipment (UE) to communicate with an evolved NodeB (eNB), the one or more processors to configure the UE to: measure intra-cell interference at the UE caused by an uplink (UL) transmission from each of a plurality of intra-cell UEs; calculate, for each intra-cell UE, a ratio of the intra-cell interference over an average inter-cell interference, and make a determination of which of an aggressor and a non-aggressor the intra-cell UE is based on whether the ratio exceeds a predetermined threshold; transmit feedback comprising at least some of the determinations to the eNB; and communicate with the eNB based on a schedule dependent on the feedback such that the UE is neither an aggressor nor is subject to interference from aggressors.

In Example 28, the subject matter of Example 29 optionally includes that the one or more processors further configure the UE to one of: calculate a ratio of an average overall DL interference plus noise over the average inter-cell interference plus noise to determine wideband channel quality indicator (CQI) degradation, the average overall DL interference comprising an average intra-cell interference from other intra-cell UL UEs plus the average inter-cell interference, and transmit wideband CQI feedback comprising quantization of the CQI degradation to the eNB, or measure a signal-to-interference and noise ratios (SINR) for each intra-cell UE, and transmit quantized SINRs as subband CQI feedback to the eNB, and the schedule is dependent on at least one of the wideband CQI feedback and the subband CQI feedback.

Example 29 is an apparatus of user equipment (UE) comprising: means for measuring intra-cell interference at the UE caused by an uplink (UL) transmission from each of a plurality of intra-cell UEs: means for calculating, for each intra-cell UE, a ratio of the intra-cell interference over an average inter-cell interference, and means for making a determination of which of an aggressor and a non-aggressor the intra-cell UE is based on whether the ratio exceeds a predetermined threshold; means for transmitting feedback comprising at least some of the determinations to the eNB; and means for communicating with the eNB based on a schedule dependent on the feedback such that the UE is neither an aggressor nor is subject to interference from aggressors.

In Example 30, the subject matter of Example 29 optionally includes one of: means for calculating a ratio of an average overall DL interference plus noise over the average inter-cell interference plus noise to determine wideband channel quality indicator (CQI) degradation, the average overall DL interference comprising an average intra-cell interference from other intra-cell UL UEs plus the average inter-cell interference, and means for transmitting wideband CQI feedback comprising quantization of the CQI degradation to the eNB, or means for measuring a signal-to-interference and noise ratios (SINR) for each intra-cell UE, and means for transmitting quantized SINRs as subband CQI feedback to the eNB, and the schedule is dependent on at least one of the wideband CQI feedback and the subband CQI feedback.

Example 31 is a method of aggressor determination comprising: measuring intra-cell interference at user equipment (UE) caused by an uplink (UL) transmission from each of a plurality of intra-cell UEs; calculating, for each intra-cell UE, a ratio of the intra-cell interference over an average inter-cell interference, and making a determination of which of an aggressor and a non-aggressor the intra-cell UE is based on whether the ratio exceeds a predetermined threshold; transmitting feedback comprising at least some of the determinations to the eNB; and communicating with the eNB based on a schedule dependent on the feedback such that the UE is neither an aggressor nor is subject to interference from aggressors.

In Example 32, the subject matter of Example 31 optionally includes one of: calculating a ratio of an average overall DL interference plus noise over the average inter-cell interference plus noise to determine wideband channel quality indicator (CQI) degradation, the average overall DL interference comprising an average intra-cell interference from other intra-cell UL UEs plus the average inter-cell interference, and transmitting wideband CQI feedback comprising quantization of the CQI degradation to the eNB, and measuring a signal-to-interference and noise ratios (SINR) for each intra-cell UE, or transmit quantized SINRs as subband CQI feedback to the eNB, and the schedule is dependent on at least one of the wideband CQI feedback and the subband CQI feedback.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system. UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus comprising:
   at least one processor configured cause a user equipment (UE) to:
   receive measurement information from a network node via radio resource control (RRC) signaling, wherein the measurement information includes uplink reference signal information for one or more other UEs;
   perform measurement of the uplink reference signals transmitted from the one or more other UEs, as part of uplink communications by the one or more other UEs with the network node, according to the measurement information during a period of downlink reception for the UE; and
   provide measurement reporting to the network node based on the performed measurements.

2. The apparatus of claim 1, wherein the at least one processor is further configured cause the UE to:
   perform average interference measurements for one or more neighboring cells; and
   provide second measurement reporting to the network node based on the performed average interference measurements.

3. The apparatus of claim 2, wherein an average interference measurement is performed over a set resource blocks which are a subset of the system bandwidth.

4. The apparatus of claim 2, wherein the average interference measurements include interference plus noise.

5. The apparatus of claim 1, wherein a quantization granularity of the measurement reporting is configured by the network node.

6. The apparatus of claim 1, wherein the one or more other UEs are served by a different cell than a first cell serving the UE.

7. The apparatus of claim 6, wherein respective periods of downlink and uplink are not aligned for the UE served by the first cell with the one or more other UEs served by the different cell.

8. A user equipment (UE), comprising:
   wireless communication circuitry; and
   at least one processor coupled to the wireless communication circuitry, wherein the at least one processor is configured cause the UE to:
   receive measurement information from a network node via radio resource control (RRC) signaling, wherein the measurement information includes uplink reference signal information for one or more other UEs;
   perform measurement of the uplink reference signals transmitted from the one or more other UEs, as part of uplink communications by the one or more other UEs with the network node, according to the measurement information during a period of downlink reception for the UE; and provide measurement reporting to the network node based on the performed measurements.

9. The UE of claim 8, wherein the at least one processor is further configured cause the UE to:

perform average interference measurements for one or more neighboring cells; and provide second measurement reporting to the network node based on the performed average interference measurements.

10. The UE of claim 9, wherein an average interference measurement is performed over a set resource blocks which are a subset of the system bandwidth.

11. The UE of claim 9, wherein the average interference measurements include interference plus noise.

12. The UE of claim 8, wherein a quantization granularity of the measurement reporting is configured by the network node.

13. The UE of claim 8, wherein the one or more other UEs are served by a different cell than a first cell serving the UE.

14. The UE of claim 13, wherein respective periods of downlink and uplink are not aligned for the UE served by the first cell with the one or more other UEs served by the different cell.

15. An apparatus comprising:

at least one processor configured cause a network node to:

provide measurement information to a user equipment (UE) via radio resource control (RRC) signaling, wherein the measurement information includes uplink reference signal information for one or more other UEs; and receive measurement reporting from the UE based on measurements performed by the UE, wherein the measurements performed by the UE are of the uplink reference signals transmitted from the one or more other UEs, as part of uplink communications by the one or more other UEs with the network node, during a period of downlink reception for the UE.

16. The apparatus of claim 15, wherein the at least one processor is further configured cause the network node to:

perform average interference measurements for one or more neighboring cells; and receive second measurement reporting from the UE based on the average interference measurements for one or more neighboring cells.

17. The apparatus of claim 16, wherein an average interference measurement is performed over a set resource blocks which are a subset of the system bandwidth.

18. The apparatus of claim 16, wherein the average interference measurements include interference plus noise.

19. The apparatus of claim 15, wherein a quantization granularity of the measurement reporting is configured by the network node.

20. The apparatus of claim 15, wherein the one or more other UEs are served by a different cell than a first cell serving the UE.

21. The apparatus of claim 20, wherein respective periods of downlink and uplink are not aligned for the UE served by the first cell with the one or more other UEs served by the different cell.

* * * * *